United States Patent [19]

Harp et al.

[11] Patent Number: 5,357,105
[45] Date of Patent: Oct. 18, 1994

[54] LIGHT MODULATED DETECTION SYSTEM FOR ATOMIC FORCE MICROSCOPES

[75] Inventors: Robert S. Harp, Westlake Village; David J. Ray, Agoura Hills, both of Calif.

[73] Assignee: Quesant Instrument Corporation, Agoura Hills, Calif.

[21] Appl. No.: 149,290

[22] Filed: Nov. 9, 1993

[51] Int. Cl.⁵ .................. G01N 23/00; G01B 11/00
[52] U.S. Cl. ........................... 250/234; 250/306
[58] Field of Search ............ 250/306, 307, 234, 561; 73/105

[56] References Cited

U.S. PATENT DOCUMENTS

| | | | |
|---|---|---|---|
| 4,724,318 | 2/1988 | Binnig | 250/306 |
| 4,800,274 | 1/1989 | Hansma et al. | 250/306 |
| 4,889,988 | 12/1989 | Elings et al. | 250/306 |
| 4,935,634 | 6/1990 | Hansma et al. | 250/560 |
| 5,025,658 | 6/1991 | Elings et al. | 73/105 |
| 5,141,319 | 8/1992 | Kajimura et al. | 356/358 |
| 5,283,442 | 2/1994 | Martin et al. | 250/561 |
| 5,298,975 | 3/1994 | Khoury et al. | 356/375 |

Primary Examiner—David C. Nelms
Assistant Examiner—John R. Lee
Attorney, Agent, or Firm—Marvin H. Kleinberg

[57] ABSTRACT

A scanning force microscope is provided with apparatus to modify the light source with a modulation scheme. Information relative to scanning tip motion is included in a modulated light beam which is then demodulated and filtered to recover the information in the form of a signal which corresponds to and is representative of a chosen parameter of tip motion.

11 Claims, 4 Drawing Sheets

LIGHT MODULATED DETECTION SYSTEM FOR ATOMIC FORCE MICROSCOPES

BACKGROUND OF THE INVENTION

The present invention relates to scanning probe microscopes and, more specifically to scanning force microscopes, sometimes referred to as atomic force microscopes utilizing modulated illumination.

Scanning force microscopes (SFM), sometimes referred to as atomic force microscopes (AFM) are used to investigate the surfaces of matter in the micrometer, nanometer, and sub-Angstrom scale. Such microscopes operate by having a probe consisting of a cantilever arm with a sharp tip located orthogonally on one end of the cantilever arm and in, or nearly in, contact with the surface to be profiled.

The cantilever arm has such a small spring constant that typically one nanonewton of force will cause a noticeable deflection. The cantilever arm will deflect due to natural forces present between the tip and the sample. The probe may be either attracted to the surface or repelled by the surface, depending on the forces at work. When relative motion in the X and Y directions exists between the probe and the sample surface, the cantilever arm will bend as topographical features of the sample move under the tip.

Typical prior art is described in U.S. Pat. Nos. 4,724,318 and 4,800,274. In these patents, microscopes are described in which the detection of cantilever arm bending is accomplished by a second probe which is suspended over the first probe. The second probe detects changes in a tunneling current flowing from the first probe to the second probe. Measurable changes in this tunneling current result when the distance between the first probe and the second probe changes as the cantilever arm portion of the first probe moves up and down as topographical features of a sample move under the first probe tip.

Subsequent prior art describes optical detectors which use only a first probe and use either light interference or light beam deflection (optical lever) to detect the bending of the probe cantilever arm due to the interaction of the forces between the surface and probe tip. The interference method is described by Y. Martin, et al, *J. Appl. Phys.* 61,4723, (1987) and the optical lever method is described by O. Marti, B. Drake, and P. K. Hansma, *Appl. Phys. Letters* 51,484 (1984). Further, U.S. Pat. Nos. 4,935,634 and 5,025,658 describe optical detection schemes in which a sample is moved in a rastered motion under the probe.

The optical lever method of detecting the probe deflection utilizes a narrow beam of light directed toward the probe. Probe deflections caused by the changing topography of the sample surface result in changes in the angle of the reflected light beam. This change is detected by means of photo-diodes. The light source may be a laser device. The photo-diodes are in close proximity to each other and form a bicell.

As the reflected light from the probe shines on the diodes, and as the probe cantilever arm moves up or down, the proportion of the light on each of the photo-diodes will change. This change is used to determine the amount of bending of the cantilever arm, thus indicating a change in the relative distance or force between the probe tip and the surface being examined.

The prior art also teaches that the sample, whose surface is to be examined, may be attached to a motion controlling device, typically a piezoelectric cylinder, the end of which moves the sample back and forth in both the X and Y directions in a rastering motion underneath the probe. Further, using the signals generated by the photo-diodes, the device moving the sample in X and Y may also control the Z direction, or height.

The photo-diode signals are typically subtracted to create a difference signal. A set-point value will then establish a constant probe deflection value. The subtraction of the difference signal from the set-point value results in an error signal. This signal is routed through feedback conditioning means to create a correction signal.

The feedback conditioning means may be either an analog circuit or a digital circuit using computing means such as is described by Hanselmann in "Implementation of Digital Controllers—A Survey" *Automatica*, Vol. 23 No 1, 1987. Digital control is described in U.S. Pat. No. 4,889,988 dated Dec. 26, 1989, as well.

The correction signal is, in turn, routed to the motion control device such that the control device keeps the cantilever arm at a constant bend angle. Consequently, the force between the probe tip and the sample surface remains essentially constant even though the topography of the sample is changing under the probe tip.

Stated differently, the probe cantilever arm is maintained at a constant deflection. The correction signal then becomes an indication of the surface profile. The correction signal may also be filtered or conditioned to produce a second signal which can enhance certain surface profile features.

The prior art system thus described provides X and Y raster signals and a Z signal indicating the surface profile. These three signals are sufficient to give surface topographical information. Persons skilled in the art recognize that the signals thus generated can be digitized and displayed by a computer with the topography represented by alternative displays.

The prior art system thus described can be enhanced and improved if the detection scheme sensing the cantilever deflection can be made to be more sensitive. Improvements in this sensitivity would yield images with greater resolution with less deflection of the cantilevered probe. Soft samples could be imaged with less chance of surface distortion by sensing smaller forces at work on the probe.

In variations of the prior art, the cantilevered portion of the probe may be intentionally excited into resonance by signals to the motion controller. In this case, as the probe tip is brought near the surface, the resonance parameters change and these changes may be used to generate a signal which controls the feedback loop to the motion controller. While this prior art approach increases the detector sensitivity, its use is restricted to samples which are either in a vacuum or in compressible fluids. It cannot be used with incompressible fluids.

This form of the prior art has advantages since the topology of the surface may be measured with less lateral force on the tip. Consequently, with some samples, the resultant image is a more accurate representation of the surface. The reduced lateral force results from the fact that the tip is momentarily pulled away from the surface during one half of the oscillatory cycle. Should the tip encounter a steep vertical feature on the sample surface, it does not experience as much lateral force since it is further away from the surface.

SUMMARY OF THE INVENTION

According to the present invention, a scanning force microscope utilizes means for modulating an energy (light) beam to increase the sensitivity of the cantilever deflection system. Means are provided to interrupt the beam or otherwise change the amplitude, polarization or other parameters of the beam as it impinges upon a reflective upper surface of the cantilever arm.

Further means are provided to extract the cantilever arm deflection information in the reflected return beam. Means for modulating the beam parameters may be either electrical or mechanical. A rapidly opening shutter, for example, which could be a rotating wheel with holes or teeth would mechanically modulate the beam.

By changing the power to the source generating the beam, the amplitude of the beam could be changed electrically. When the power source of a laser diode, for example, is pulsed, the intensity of the light generated during the pulse may be considerably greater than if the laser diode were provided with continuous power.

By pulsing, or otherwise modulating the light intensity, information regarding the cantilever deflection is contained in sidebands about the modulating frequency and its harmonic components. The information is now available at higher frequencies.

It is well known that many photo-detectors have low frequency electrical noise which increases with the inverse of frequency. This so called 1/f noise is greater at those frequencies which are at or near zero frequency. Since, in the present invention, the information is contained as sidebands around higher frequencies, the demodulated information does not suffer from the low frequency noise of the photo-detector or preamplifiers.

In a typical instrument, the deflection signal may be in the range of 10 to 100 Hz whereas the modulation of the energy beam may be in the range of 50 KHz. This results in a noise power reduction factor of from 500 to 5,000 at the detector, yielding much improved sensitivity.

Various schemes for demodulating the returning beam may be employed. A simple amplitude modulated signal envelope detecting circuit may be used or a more complicated synchronous demodulating scheme may be used.

Accordingly, it is an object of the invention to provide a microscope system with increased photo-detector sensitivity.

It is an additional object of the invention to reduce the effects of noise in the photo-detector output and improve the signal to noise ratio.

It is yet a further object of the invention to improve the sensitivity of an atomic force microscope.

The novel features which are characteristic of the invention, both as to structure and method of operation thereof, together with further objects and advantages thereof, will be understood from the following description, considered in connection with the accompanying drawings, in which the preferred embodiment of the invention is illustrated by way of example. It is to be expressly understood, however, that the drawings are for the purpose of illustration and description only, and they are not intended as a definition of the limits of the invention.

BRIEF DESCRIPTION OF THE DRAWINGS

FIGS. 4A, 4B and 4C, is a block diagram of a modulation technique, suitable for use in the present invention.

DETAILED DESCRIPTION OF THE DRAWINGS

Figure 1:
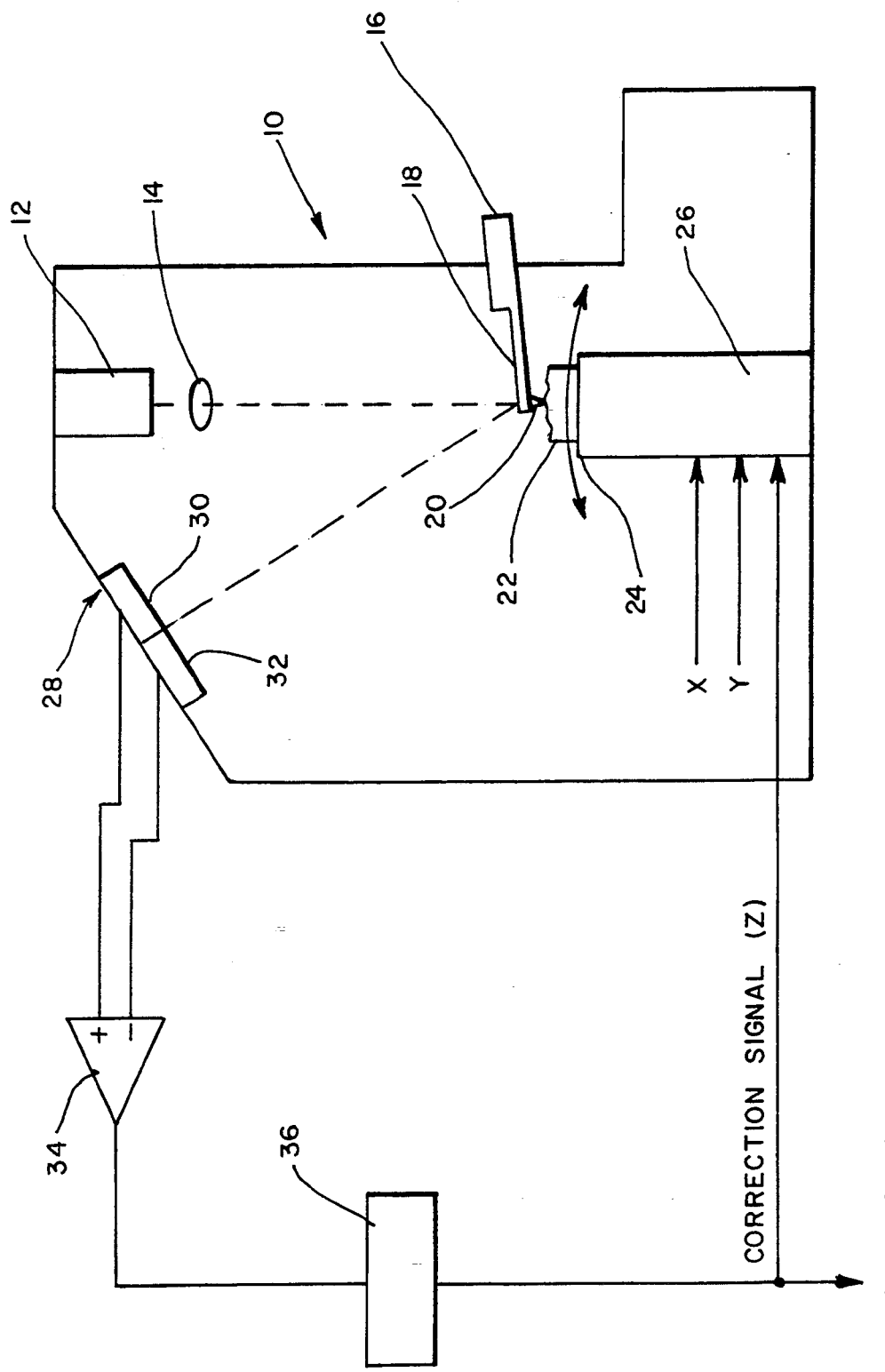
FIG. 1 is a simplified diagram of a prior art microscope using a laser beam deflection system.

Referring to FIG. 1, a prior art scanning force microscope system 10 includes a light source 12 which may be a laser, which directs a continuous steady light beam to a lens 14. The lens 14 focusses the light beam on a probe 16 which includes a lever 18. Lever 18 is mounted such that it does not move in the X and Y directions.

Lever 18 has a pointed tip 20 on the side facing a sample 22. Sample 22 is mounted on the free end 24 of a piezo-electric element 26 which, in this embodiment, has a cylindrical shape. The focussed light beam is continuous and reflects from the free end 24 of the probe 16 and is directed to a photo-diode bitell 28 which includes a first photo-diode 30 and a second photo-diode 32.

Probe motion in the vertical direction (Z) is detected when the reflected light beam moves from one of the photoelements to the other. Signals from the photo-detector elements 30, 32 are applied to a differential amplifier 34 to form a difference signal which is applied to a feedback system 36.

The feedback system 36 generates a correction signal which is applied to the piezo-electric element 26 to cause it to expand or contract in a predetermined manner in order to maintain a desired spacing or force between the probe tip 20 and the sample 22. The correction signal sent to the piezo-element 26 may also be used as an indication or representation of the surface topography of the sample 22.

Figure 2:
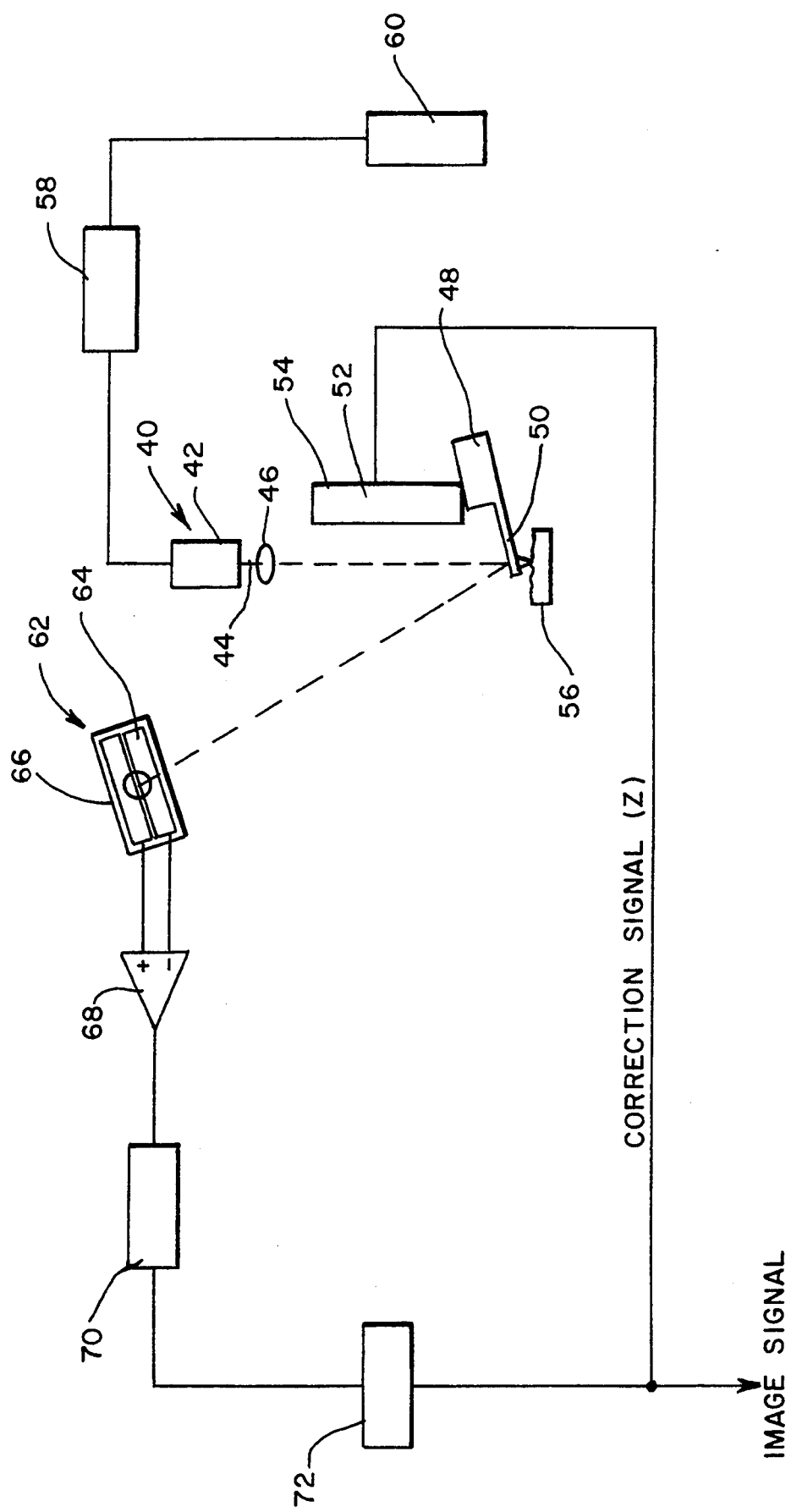
FIG. 2 is a diagram of a microscope system according to the present invention.

A microscope system 40 according to the present invention is shown in FIG. 2. A light source, preferably a laser 42 generates an energy beam 44 which is directed through a lens 46. The lens 46 focusses and directs the energy beam 44 onto a probe 48 which includes a lever 50.

The probe 48 and lever 50 are attached to position controlling means 52 which may be in the form of a piezoelectric cylinder 54. Position controlling means 52 provides lateral as well as vertical motion to probe 48 and lever 50. Vertical control of lever 50 is thus provided which allows lever 50 to ride at or near the surface of a sample 56.

The energy beam 44 is driven by a modulator 58 which modulates power provided by a power source 60 which provides steady, uninterrupted power. The power provided to the energy beam source, laser 40, has amplitude peaks which may be greater than the maximum steady power that would otherwise be allowed.

Energy beam 44 reflects off of lever 50 and onto beam position detecting means 62 which may be in the form of separate first and second photo-diodes 64, 66. The resulting modulated signals from the photo-diodes 64, 66 may be routed to difference amplifier 68. The difference signal resulting from difference amplifier 68 may then be demodulated by a demodulator 70.

The demodulated signal is then routed through feedback conditioning circuitry 72 and the resulting correction signal is applied to position control means 52 to establish the vertical position of the probe 48 and lever 50. The correction signal may be combined with the value of the lateral position control signals to create a representation of the surface of sample 56.

Figure 3:
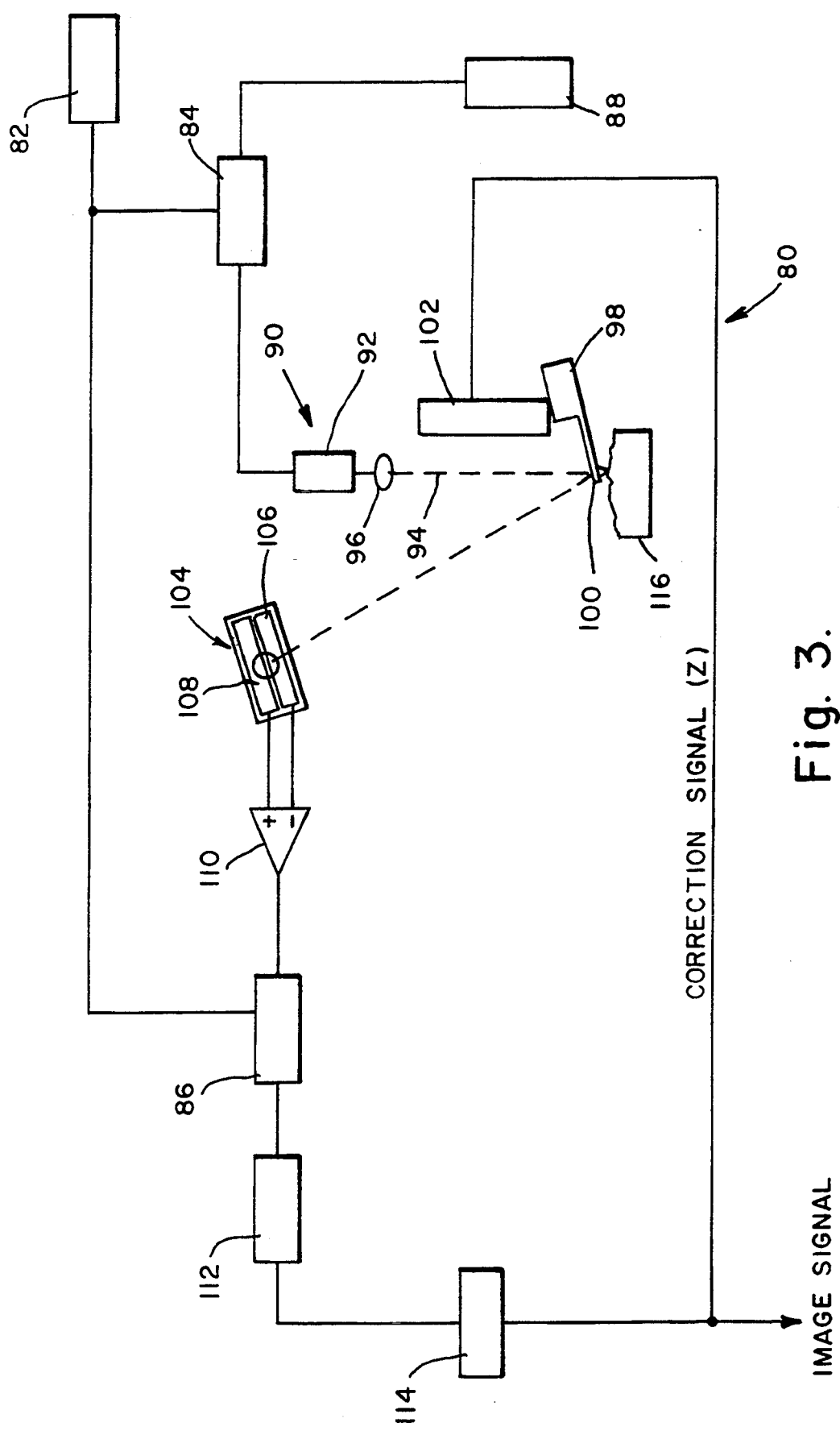
FIG. 3 shows an alternative embodiment of a microscope system according to the present invention.

FIG. 3 illustrates an alternate embodiment of a microscope system 80 according to the present invention. In this embodiment, an oscillator or pulse generator 82 provides a signal to a modulator 84 and to a demodulator 86. The modulator 84 receives steady uninterrupted power from a power source 88 as well as an alternating or pulsed signal from the pulse generator 82.

The modulated signal is applied to a radiant energy source 90 which may take the form of a laser 92. The modulated energy beam 94 which results is focussed and directed by lens 96 toward a probe 98 which includes a lever 100. Probe 98 and lever 100 are positioned laterally and vertically by positioning means 102.

The modulated energy beam 94 is reflected off the upper side of lever 100 toward a detector 104 which consists of two photo-diodes 106, 108. The signals created by photodiodes 106, 108 are routed to difference amplifier 110. The demodulator 86 receives the difference signal from difference amplifier 110 and the oscillatory or pulsed signal from generator 82 and performs synchronous demodulation.

The synchronous demodulated signal is routed through low-pass filter 112 and feedback circuit 114 resulting in a correction signal to be used by the positioning means 102 such that lever 100 is positioned on or near the surface of a sample 116. The correction signal may also be used in conjunction with the lateral signals to generate a representation of the surface of sample 116.

Figure 4:
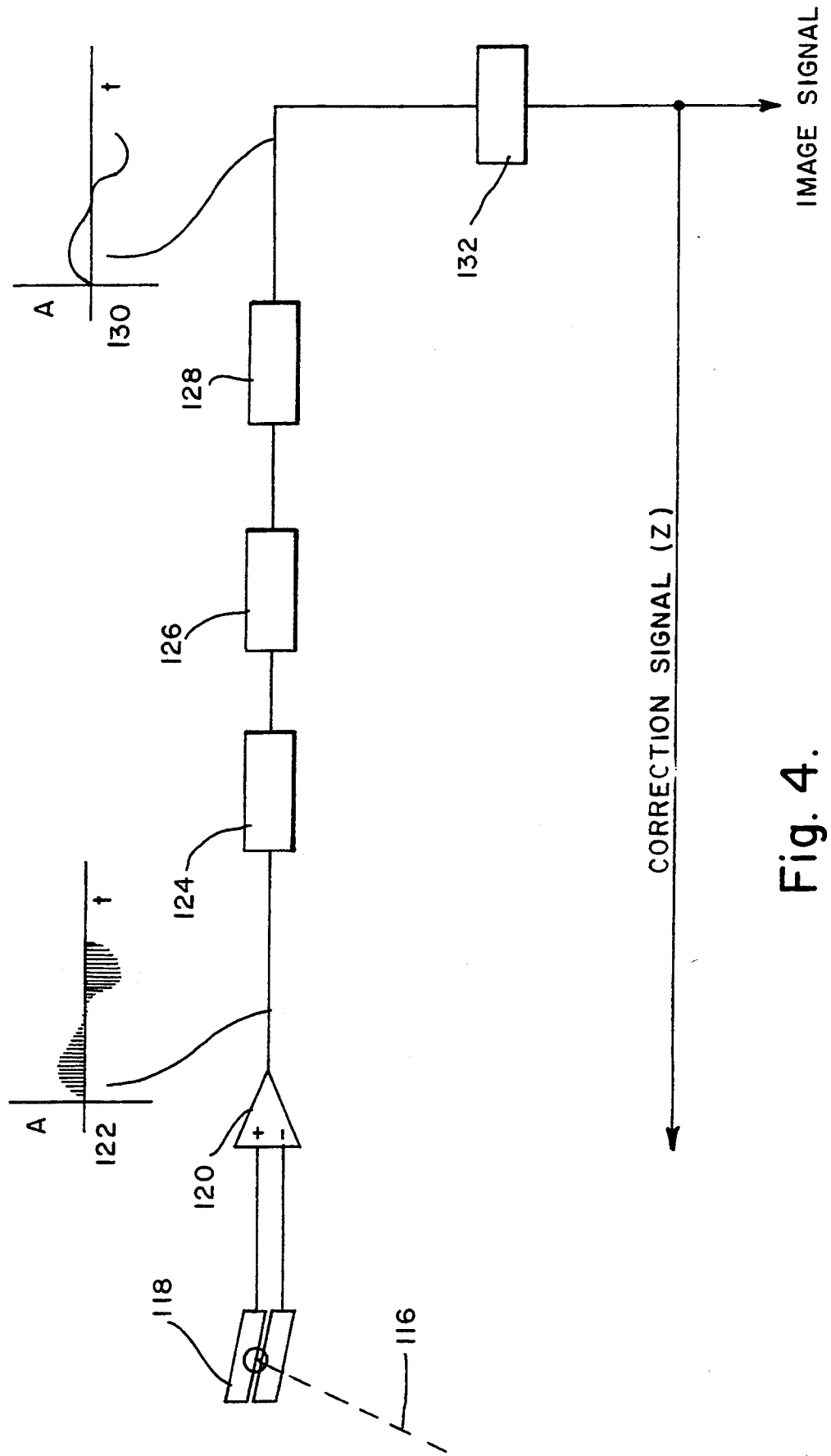
FIG. 4, which includes

Turning next to FIG. 4, there is shown an example of an amplitude modulation-demodulation scheme. The light beam returning from the sample surface falls upon a detector bicell 118 that is substantially similar to the detectors of the illustrated embodiments. The output signals from the detector bi-cell 118 are applied to a differential amplifier 120 which generates a difference signal 122 as is shown in the time plot of FIG. 4B.

As can be seen, the signal is a series of pulses whose amplitudes vary with time. To achieve this, the light source beam is interrupted, either mechanically with a light chopper or electrically with any of a plurality of power interrupting circuits. The difference signal 122 is applied to a high pass filter 124 which removes any low frequency drift or noise caused in the photo detector bi-cell 118 and any noise in the differential amplifier 120.

The filtered signal is applied to a demodulator 126. Demodulators are well known and it is a matter of design choice whether one uses a peak detector, a ring demodulator or a synchronous demodulator. The demodulated signal is then applied to a low pass filter 128 which removes any ripples or unevenness that might result from the demodulation process.

The low pass filter output signal 130 is illustrated in the graph of FIG. 4C. This output signal 130 is now a smooth analog signal corresponding to and representative of the probe cantilever movement and can be further processed in a feedback circuit 132.

In further variations of the present invention, four or more photo-diodes can be employed such that twisting or torque applied to the probe can be detected, as well as the vertical deflection of the probe described above.

The present invention may also be combined with means for exciting the probe into vibration at or near it's resonant mode such that, as the probe nears the sample surface, changes in the resonant parameters (such as amplitude or phase) may be detected and used as a signal to control the Z direction of the movable element.

Others skilled in the art may devise different and alternative embodiments of the present invention. Accordingly, the scope of the invention should be limited only by the claims presented below.

What is claimed as new is:

1. A scanning force microscope device comprising in combination:
   a. a sensing probe having a reflective surface on one side and a scanning tip on the opposite side, said tip adapted to be positioned adjacent a surface to be scanned;
   b. illuminating means for generating a radiant energy beam and for applying said beam to said reflective surface;
   c. modulating means for periodically changing said radiant energy beam in a predetermined fashion to produce a modulated energy beam;
   d. position control means for moving said scanning tip in a predetermined pattern to follow the contours of a surface to be scanned;
   e. detector means in the path of the portion of said modulated energy beam returned from said reflective surface and operable in response to changes in the energy beam position caused by tip movement in a predetermined direction to produce a motion signal representative of tip movement corresponding to the contours of the scanned surface; and
   f. demodulating means for recovering the information contained in the modulated signal produced by said detector means, whereby tip motion in a direction orthogonal to scanning motion results in motion of said modulated radiant energy beam which is demodulated to produce an electrical signal corresponding to and representative of the surface contour of a scanned surface.

2. The microscope of claim 1 wherein said radiant energy beam source is a laser.

3. The microscope of claim 1 wherein said illuminating means include a lens.

4. The microscope device of claim 3 wherein said lens narrowly focuses said modulated radiant energy beam at said reflective tip surface.

5. The microscope device of claim 1 wherein said detecting means are composed of at least two photo-detecting cells.

6. The microscope device of claim 1 wherein said modulating and demodulating means including synchronous modulation and demodulation to change said beam.

7. The microscope device of claim 1 wherein said modulating means include mechanical means to change said energy beam.

8. The microscope device of claim 1 wherein said modulating means including electrical means to change said energy beam.

9. The microscope device of claim 1 wherein said modulating means include amplitude modulating of said energy beam.

10. The microscope device of claim 1 wherein said modulating means include polarization modulating of said energy beam.

11. The microscope device of claim 1 wherein said modulating means include phase modulating of said energy beam.

* * * * *